(12) United States Patent
Barda

(10) Patent No.: US 11,733,595 B2
(45) Date of Patent: Aug. 22, 2023

(54) MOBILE DEVICE FOR MOVING A RECORDING APPARATUS

(71) Applicant: Sinectro Ltd., Tel Aviv (IL)

(72) Inventor: Ilan Nani Barda, Tel Aviv (IL)

(73) Assignee: Sinectro Ltd., Tel Aviv (IL)

( * ) Notice: Subject to any disclaimer, the term of this patent is extended or adjusted under 35 U.S.C. 154(b) by 39 days.

(21) Appl. No.: 17/371,317

(22) Filed: Jul. 9, 2021

(65) Prior Publication Data

US 2022/0011655 A1 Jan. 13, 2022

(30) Foreign Application Priority Data

Jul. 9, 2020 (DE) ...................... 10 2020 118 079.9

(51) Int. Cl.
*G03B 17/56* (2021.01)
*F16M 11/42* (2006.01)
*F16M 11/04* (2006.01)
*F16M 11/08* (2006.01)

(52) U.S. Cl.
CPC ......... *G03B 17/561* (2013.01); *F16M 11/048* (2013.01); *F16M 11/08* (2013.01); *F16M 11/42* (2013.01); *F16M 2200/04* (2013.01); *F16M 2200/08* (2013.01)

(58) Field of Classification Search
CPC ...... G03B 17/56; F16M 11/048; F16M 11/08; F16M 11/42; F16M 11/04; F16M 11/12; F16M 11/10; F16M 11/18; F16M 2200/04; F16M 2200/08
USPC ....................................................... 396/428
See application file for complete search history.

(56) References Cited

U.S. PATENT DOCUMENTS

| 4,003,584 | A | * | 1/1977 | Zelli | ..................... | B66F 11/048 |
| | | | | | | 280/47.11 |
| 5,174,593 | A | * | 12/1992 | Chapman | ................ | F16M 11/42 |
| | | | | | | 280/47.11 |
| 5,197,700 | A | * | 3/1993 | Chapman | .............. | F16M 11/425 |
| | | | | | | 396/428 |
| 5,375,863 | A | * | 12/1994 | Chapman | .............. | B62D 7/1509 |
| | | | | | | 180/234 |
| 5,490,684 | A | * | 2/1996 | Chapman | .............. | B66F 11/048 |
| | | | | | | 280/47.11 |
| 5,492,353 | A | * | 2/1996 | Chapman | .............. | B66F 11/048 |
| | | | | | | 280/47.11 |
| 5,516,070 | A | * | 5/1996 | Chapman | ............... | B62D 21/18 |
| | | | | | | 396/428 |
| 5,586,162 | A | * | 12/1996 | Grichnik | .............. | A61B 6/4405 |
| | | | | | | 378/189 |
| 6,775,475 | B1 | * | 8/2004 | Traver | ................... | G03B 15/00 |
| | | | | | | 396/428 |

(Continued)

FOREIGN PATENT DOCUMENTS

| CA | 2653462 | A1 | * | 8/2009 | ............ | B66F 11/048 |
| DE | 1555048 | A1 | * | 10/1970 | ............... | B60P 3/00 |

(Continued)

*Primary Examiner* — Clayton E. LaBalle
*Assistant Examiner* — Kevin C Butler
(74) *Attorney, Agent, or Firm* — Bachman & LaPointe, P.C.

(57) ABSTRACT

In the case of a mobile device (P) for moving a receiving device which is arranged on a support column (46.1, 46.2) and this support column (46.1, 46.2) is assigned a base (1), the support column (46.1, 46.2) is to be held on the base (1) by a clamping device (K).

25 Claims, 5 Drawing Sheets

(56) References Cited

U.S. PATENT DOCUMENTS

| | | | | |
|---|---|---|---|---|
| 6,776,488 | B2* | 8/2004 | Burbulla | B66F 11/048 |
| | | | | 396/428 |
| 9,638,986 | B1* | 5/2017 | Chapman | B66F 11/048 |
| 11,099,464 | B2* | 8/2021 | Chapman | B66F 3/25 |
| 11,292,704 | B2* | 4/2022 | Chapman | F16M 11/28 |
| 2007/0095246 | A1* | 5/2007 | Heiligenmann | F16M 11/16 |
| | | | | 104/307 |
| 2011/0008037 | A1* | 1/2011 | Viggiano | G03B 17/00 |
| | | | | 396/428 |
| 2013/0134269 | A1* | 5/2013 | Karl | E01B 23/02 |
| | | | | 248/157 |
| 2013/0259463 | A1* | 10/2013 | Dybowski | F16M 11/24 |
| | | | | 396/428 |
| 2014/0299013 | A1* | 10/2014 | Hall | F16M 11/043 |
| | | | | 104/307 |
| 2019/0337785 | A1* | 11/2019 | Chapman | B62B 3/001 |
| 2020/0319535 | A1* | 10/2020 | Chapman | B66F 3/25 |
| 2022/0011655 | A1* | 1/2022 | Barda | F16M 11/42 |

FOREIGN PATENT DOCUMENTS

| | | | | |
|---|---|---|---|---|
| DE | 19643805 C2 | * | 5/1999 | F16C 29/045 |
| DE | 202008012368 U1 | * | 12/2008 | F16M 1/04 |
| DE | 102009041862 A1 | * | 3/2011 | B66F 11/048 |
| DE | 102010033533 A1 | * | 2/2012 | E01B 23/00 |
| DE | 202013100207 U1 | * | 4/2013 | A47C 9/022 |
| EP | 3165497 B1 | * | 12/2021 | B62D 5/0421 |
| GB | 1116903 A | * | 7/1966 | B62D 7/00 |
| GB | 2485262 A | * | 5/2012 | B66F 11/048 |
| WO | WO-9206034 A | * | 4/1992 | F16M 11/08 |
| WO | WO-9503204 A1 | * | 2/1995 | B60G 99/00 |
| WO | WO-2012016714 A1 | * | 2/2012 | E01B 23/00 |
| WO | WO-2017161461 A1 | * | 9/2017 | B66C 23/62 |

\* cited by examiner

MOBILE DEVICE FOR MOVING A RECORDING APPARATUS

BACKGROUND OF THE INVENTION

The invention relates to a mobile device for moving a recording apparatus which is arranged on a support column and this support column is assigned a base.

In the production of TV shows, feature films, video clips and other movie pictures, it is necessary to move a camera between different shooting locations on wheels or rails. This movement includes not only raising and lowering the camera but also all other movements in three-dimensional space to capture the subject in the correct camera position. An uninterrupted movement of the camera, i.e. following an action or a moving sequence, is often required. In many cases, the action itself takes place on the spot, i.e. at locations which usually form the background for such sequences of a film. Accordingly, it is necessary to carry the camera at certain difficult locations, so that it should weigh little and be easy to carry.

However, carrying the camera today is only an exceptional case, since any shaking, vibration, trembling or wobbling causes the recorded film or video sequence to become unacceptably wiggly or blurred. Therefore, in many cases dollies are used today, which carry the camera and carry out the desired movements. Today, such a dolly should not only carry and move the camera itself, but also at least one additional cameraman, who usually also has considerable weight. For this reason, the dolly must have considerable stability and rigidity. For this purpose it must also move very quietly, as it must not disturb the recording sequence or there is even noise from it on the sequence. This is of course especially true for the production of live broadcasts, where any background noise is extremely disturbing.

DE 1 555 048 A1 already points out that the movement of a camera, especially while it is working, must be delicate and its direction must be precisely controllable so that it is possible to move the camera from one point to another along a precisely predetermined path. For this purpose, film and television cameras are generally mounted on moving platforms, which are referred to in the trade as "camera dollies". If such dollies can be moved very easily in various directions, they are called "crab dollies".

DE 1 655 549 A1 also describes a steering device for a vehicle that has two steered wheels and one rigid or two or more coaxial rigid wheels. The purpose of the invention is to demonstrate an improved steering device which is particularly useful for a camera dolly with two steered and two coaxial rigid wheels.

Further camera dollies are known, for example, from the U.S. Pat. Nos. 4,003,584 A1, 6,775,475 B1 or the DE 691 29 369 T2. From the latter, the instability of the support column carrying the camera is also apparent.

In many cases it is also necessary to guide the camera dolly on rails. This applies not only to uneven terrain, but generally when precise guidance of the camera is required. However, as these tracks usually have to be quickly positioned at another location, the camera dolly should be easily mounted on and dismounted from the tracks. DE 10 2009 043 957 B1, for example, shows a limited guidance in rails.

A complete rail system for camera dollies together with a support fitting for height-adjustable support of rails is shown in WO 2012/016714 A1. The present invention relates primarily to a rail-supported camera dolly.

SUMMARY OF THE INVENTION

The object of the present invention is to create a vehicle of the above mentioned type with which a camera can be guided and moved as noiselessly, well fixed and safely as possible and which is very easy to handle.

The solution to the object is that the support column is held on the base by a clamping device.

Whereas earlier recording devices were usually placed on a tripod consisting of three supports spread at an angle of about 120°, today's relatively heavy recording devices, such as television cameras, have a lower platform, which is supported by wheels, on which the support column is placed, on which either the television camera sits directly or a plate is placed in between. These mobile recording devices are then moved by a cameraman in the room as desired.

However, many scenes should not be moved by hand but by a dolly, especially a rail-supported dolly, to improve the quality of the recording. The present inventive fixing of the support column to a clamping device on the dolly ensures a secure and stable fixing of the recording device, which avoids shaking or blurring of the recording sequence. This applies not only to the above-mentioned television broadcasts, feature films, video clips and other Movie Pictures, but especially to all live broadcasts, for example live concerts, sports events, political events, etc. Here, countless possibilities of using the dollies according to the invention are conceivable and should be covered by the invention.

It is preferred that the clamping device at least partially encloses the support column. Depending on the design of the support column, the clamping device may be positioned more or less high relative to the base or may even be adjustable in height. The only important thing is that the support column is held by the clamping device as wobble-proof as possible.

In a simple example of the present invention, elements with indentations are provided for fixing the support column, which are adapted to the diameter of the support column so that they enclose the support column as far as possible. Preference is given to two opposing elements with corresponding indentations, the distance between them being variable.

However, since not every support column has the same diameter, the clamping device should also be able to accommodate different diameters. This can be done by having an inner area with a smaller radius and an adjoining outer area with a larger radius, or by using different elements with impressions of different diameters.

The base itself should be as low as possible, so that a carrier vehicle with the pick-up device can be easily placed on the base, especially pushed on. For this purpose it is intended that the base as a whole is trapezoidal in shape, with a shorter and a longer base side lying parallel opposite each other, connected by outer sides. Frame strips protrude from the short base side, which serve as stops for the wheels of the carrier vehicle. However, the trapezoidal design of the base is only exemplary. Any other geometric shape is also conceivable. However, the trapezoidal design has the advantage that a support of the base by means of rollers at three points, as described later, is sufficient and still ensures a good weight distribution for the recording device, which is also supported by three points in many cases.

The two outer sides can also be limited by frame strips, while the long base side is open. This means that the carrier vehicle, which in most cases has three wheels, only needs to be tilted over one wheel so that the other two wheels can be pushed onto it via ramps on the base. Their travel path is then limited by the frame strips on the short base side. However, the width of the base is designed so that the third wheel of the carrier vehicle, which is located behind the support column, can also be placed on the base. The support column itself is thus largely centred on the base and can be held by the clamping device.

Of course, such a dolly can be moved manually by an operator either freely or on rails, so that this possibility should also be covered by the invention. For example, a cameraman can also stand on this dolly. The dolly also has room for more than one person. However, motorized operation of the dolly is preferred, whereby one operator can sit on a seat. This seat is usually located at the base, so that the weight of the operator has to be balanced on the opposite side. It should preferably take place at both ends of the long base side of the trapeze. In a simple design example, vertical columns are located in these corners, onto which weight plates with holes in the middle can be slid. However, many possibilities are conceivable here and should be covered by the invention.

In many cases, a seat once fixed is not sufficient for the operator. An opportunity must be created so that the operator can also change his orientation to the recording device or the sequence to be recorded. For this reason, it is intended that the seat can be easily removed from an appropriate seat receptacle, for example a sleeve, and inserted into another receptacle, for example a sleeve positioned at the base.

A problem is of course the relatively high weight of the dolly. In the context of the invention, the dolly should be easily movable, i.e. it should also be portable by the operator. For this purpose, the base and also the frame strips have corresponding recesses, which reduces the weight of the base, as it is likely to be made of metal in most cases.

In addition, the base and frame strips are provided with a number of recesses to facilitate handling by the operator. In addition, the dolly should be dismountable as far as possible. This means that the base itself should consist of at least two plates which are joined and screwed together along a centre line. It should also be possible to remove the frame strips from the base by simply screwing them together. The same applies to the entire clamping device.

In order to keep the base as low as possible but still be able to move it safely and easily, appropriate rollers should be arranged below the trapezoidal base. If the rollers are to be placed on rails, it has been found advisable to use pairs of rollers whose axes of rotation are set at an angle to each other. This will ensure that the rollers on both sides of a rail run along it. Corresponding pairs of rollers are arranged close to the short base side on the one hand and in the end areas of the long base side on the other.

This dolly should be particularly suitable for driving curves on rails that are laid at any angle, as desired. Taking a 90° curve is no problem for the dolly. In order to take account of a change in distance in the area of a curve on a rail track, the roller pairs should be arranged near the short base side so that they can be displaced approximately perpendicular to the direction of travel. In this case, a corresponding roller carriage can be displaced along two guides, these guides running perpendicularly to the direction of travel. In addition, both these rollers and the rollers at the ends of the long base side can be moved in as many different ways as possible and can thus accommodate any change in direction.

The rollers at the ends of the long base side are preferably coupled to the base via a housing covering the rollers with a support arm. The housing can rotate about a vertical axis relative to the support arm.

In order to be able to move this dolly, which is in accordance with the invention, drives are provided. In a simple preferred design example, two friction rollers serve as drives, whose axes of rotation are approximately vertical and parallel to each other and between which a rail is mounted. At least one of these friction rollers contains an electric motor or the like, which is controlled by a control system that can be operated by the operator. For this purpose, either a joystick or appropriate pedals are provided for the operator. An additional person to push the dolly is of course not necessary in this case.

The friction rollers are each located on a half-plate, the distance between them can be adjusted, so that, for example, the distance between the friction rollers can be readjusted if the friction roller wears out. Furthermore, these half plates are preferably hinged to the housing, which covers the pairs of rollers described above.

It is also within the scope of the invention that the mobile device has corresponding sensors which detect an approach to persons or objects standing in the way and stop the dolly. Furthermore, optical signals are also provided on the dolly, which indicate in which function or mode the dolly is located.

Normally, there should be light strips on the housings which cover the pairs of rollers.

The mobile device according to the invention is, as already mentioned above, manually operated. However, a semi-automatic or fully automatic version is also possible, whereby in the semi-automatic version, the dolly is still intended to be operated by an operator who can operate a joystick or the pedals. In the fully automatic version, it is intended to preprogram the entire control system for a desired movement of the mobile equipment. This can be done on site, or the control system can already contain target movements. All this should also be covered by the inventive idea.

The entire control system preferably also includes software which can be used to control the functions of the dolly in detail. This includes not only left or right-hand travel or the acquisition of sensor signals or the output of light signals, but also, for example, the programming of a preset travel, which can then be repeated again and again. Certain repetitive movements and functions can also be stored in the control system as set values so that they can be easily called up by the operator.

It is also essential that the base is kept as horizontal as possible and thus the recording device is also in the appropriate horizontal position. For this reason, corresponding levelling devices, for example simple bubble levels, are integrated in the base, especially in the frame strips. Changing the height of the dolly is usually done by more or less lifting the rails. This can be done in simple mechanical ways, for example by more or less screwing adjusting bolts into sleepers which connect the rails.

In the present invention, great importance is attached to the fact that the entire system is assembled in a modular fashion. As described above, the base can be easily disassembled, but the same applies to the drives and the housings which cover the pairs of rollers.

BRIEF DESCRIPTION OF THE DRAWINGS

Further advantages, features and details of the invention can be found in the following description of preferred design examples and in the drawing, which shows in FIG. 1 a perspective view of a mobile device for moving a recording apparatus according to the invention.

DETAILED DESCRIPTION

Figure 1:
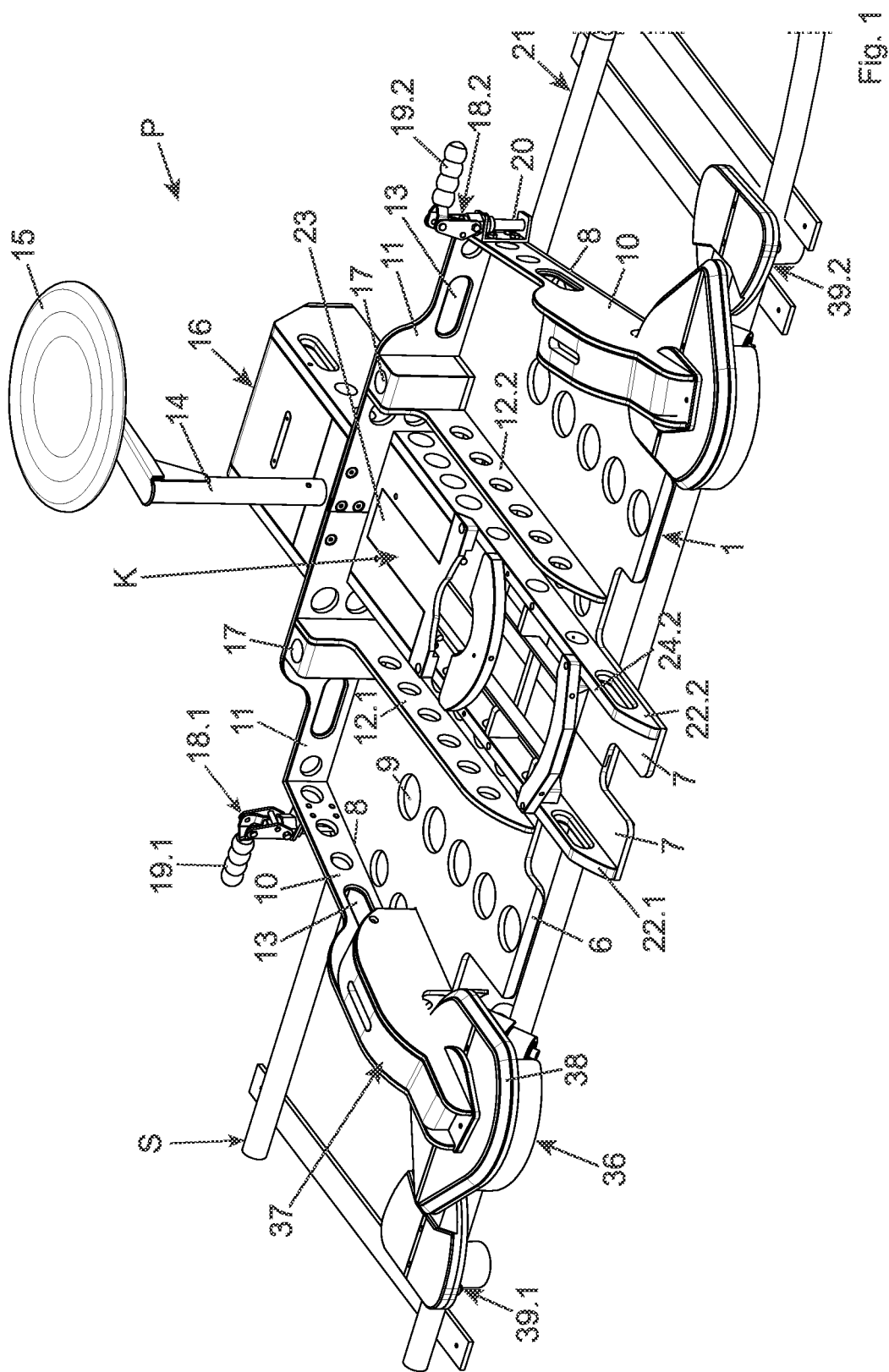
Figure 3:
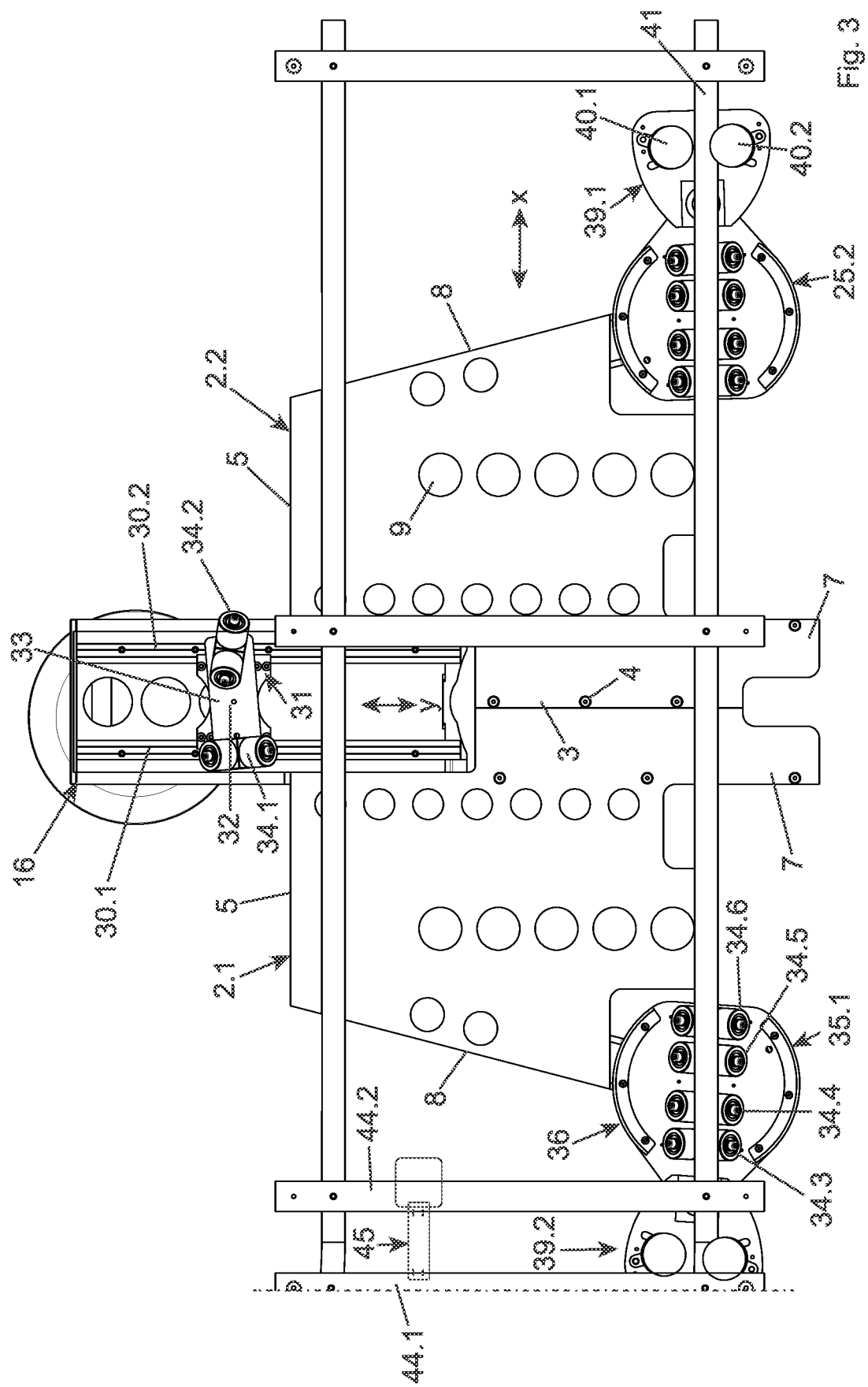
FIG. 3 a bottom view of the mobile device according to FIG. 1.

A mobile device P according to the invention for moving a recording apparatus, not shown in detail, for example a corresponding recording camera, has a base 1 according to FIG. 1, which is composed of two plates 2.1 and 2.2 as shown in FIG. 3 from below. For this purpose, the two plates 2.1 and 2.2 are joined together along an impact line 3 and connected with fasteners 4.

Plates 2.1 and 2.2 are essentially trapezoidal in shape, with a short base side 5 opposite an imaginary longer base side which is not linear but has various gradations. An access ramp 6 (see FIG. 1) is formed by one gradation and a partial access ramp 7 by another gradation. These access ramps 6 and 7 serve, as will be described later, to facilitate the access of the carrier vehicle for the receiving equipment to the base 1. The middle legs of the two trapezoids together form the joint line 3, the outer end of each trapezoid is formed by an outer leg 8. To save weight, recesses 9 are formed in plates 2.1 and 2.2.

Frame strips 10, 11 and 12 are attached to plates 2.1 and 2.2 along the outer legs 8, the base sides 5 and approximately parallel to joint line 3. In addition to weight-saving recesses, these strips also have recesses 13 for better handling of base 1 and plates 2.1 and 2.2. Furthermore, the frame strips 11 on the base sides 5 serve as stops for wheels 47.1 and 47.2 of a carrier vehicle T1 and T2 shown in FIGS. 4 and 5, which are guided between the frame strips 12 and 10 to the base sides 5.

Approximately at the level of the joint line 3, a gallow 14 protrudes, to which a seat 15 for an operator for the recording equipment not shown in more detail is assigned. This gallow 14 is removably inserted into a housing 16 and can be removed from the housing 16 and inserted into another seat 17 for the purpose of eccentric positioning of the operator.

Brakes 18.1 and 18.2 are also provided to the left and right of seat 15 and can be operated by means of a corresponding lever 19.1 and 19.2. In a simple design example, a plunger 20 is lowered onto a rail 21 so that the mobile device P can no longer move on a rail line S.

A clamping device K is provided between the opposite frame strips 12.1 and 12.2. This clamping device K is channel-shaped, whereby the two partial access ramps 7 represent an entrance to this clamping device K. On the edge side, two wall strips 22.1 and 22.2 run approximately parallel to each other from the two partial access ramps 7 to the rear in the direction of the frame strips 11. On these wall strips 22.1 and 22.2 a T-piece 23 rests in its front area with its crossbeam at the edge and can be moved and fixed along the two upper edges 24.1 and 24.2 of the wall strips 22.1 and 22.2.

Figure 2:
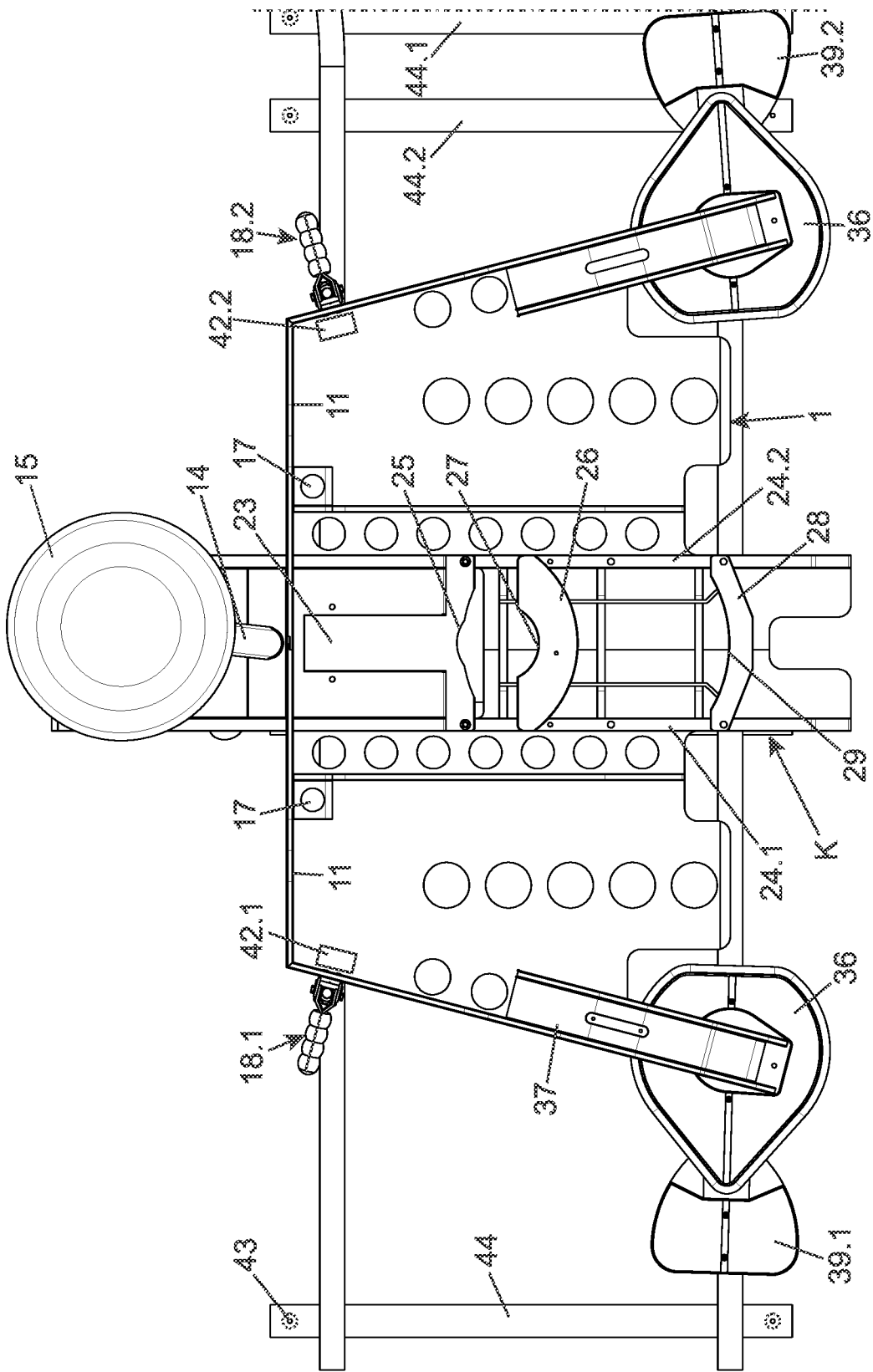
FIG. 2 a top view of the mobile device according to FIG. 1.

As can be seen in particular in FIG. 2, the T-piece 23 has an indentation 25 in the edge of its crossbar, which has a smaller radius in the middle than on the outside. This T-piece 23 works together with a trough strip 26, which also has an indentation 27 towards the indentation 25.

The T-piece 23 can, if required, be assigned a further clamping strip 28 instead of the trough strip 26, which in turn has a indentation 29 with a much larger radius than the indentation 27.

As shown in FIG. 3, it can also be seen that two guides 30.1 and 30.2 for a roller slide 31 are provided below the housing 16 and partly below the clamping device K. Along these guides 30.1 and 30.2 the roller slide 31 can be moved in the direction of the double arrow y and thus transversely to the direction of travel x of the entire mobile device P. Rotating around a central axis 32, a holding strip 33 is arranged on the roller slide 31, which holds a pair of rollers 34.1 and 34.2, which diverge at an angle, on both sides. The roller pairs 34.1 and 34.2 are also rotatably mounted on the holding strip 33. Their main purpose is to compensate for the distances between the rails of the rail line S, especially in curves.

In the two outer corners of the plates 2.1 and 2.2 there is one roller guide 35.1 and 35.2 each, which are of the same design. Each of the roller guides 35.1 and 35.2 has four pairs of rollers 34.3 to 34.6, which, like the roller pairs 34.1 and 34.2, have a holding strip not shown in detail and are arranged in a housing 36 so as to be movable on all sides virtually in one plane. The housing 36 in turn is mounted rotatably on a support arm 37.

In addition to accommodating the roller pairs 34 and their cover, the housing 36 also has an LED light strip 38, the colour of which indicates certain functions of the mobile device P. For example, red means that the mobile device P has started moving and the environment must be treated with care, the opposite is true for green. For example, blue indicates that the recording device is running, and so on.

In the version just described, the mobile unit P is also suitable for manual use, whereby appropriate operators can move the mobile unit P along the track S.

In an improved version, two drives 39.1 and 39.2 are additionally provided, hinged to the respective housing 36. In particular in FIG. 3, two frictionally engaged rollers 40.1 and 40.2 are provided for the drive in each case, which receive between them a rail 41 of the rail line S. In these rollers 40.1 and 40.2 corresponding electric drives are integrated, whose left and right rotation is controlled by a joystick or by foot pedals 42.1 or 42.2 (see FIG. 2), as desired. The complete control of the drives 39.1 and 39.2 or the light strips, but also of corresponding sensors, not described in detail, which monitor the movement of the mobile device P, is located in the housing 16.

Furthermore, on base 1, and here in particular on the frame strips 10, 11 or 12, vials are provided by which the horizontal position of base 1 can be monitored. The height of the rail track S is changed, for which purpose corresponding height-adjustable feet 43 are provided at the ends of sleepers 44.

The mode of operation of the present invention is as follows and is described in more detail in particular on the basis of FIGS. 4 and 5:

Both the rail track S and the mobile device P can be assembled and disassembled in a modular manner so that they can be handled and transported to a certain extent despite a relatively high weight, which also requires the stability of the mobile device P.

If the mobile unit P is to be used at a desired location, the rail track S is set up first. Here it is provided that the rails 41 can be inserted into one another in the form of sleeves at their ends and adjacent sleepers 44.1 and 44.2 are connected to one another by means of a quick-release clamping device 45.

A housing 36 containing the four pairs of rollers 34.3 to 34.6 is screwed to each support arm 37. Before or after this, the drives 39.1 and 39.2 can be connected to the housing 36. Then the two plates 2.1 and 2.2 are joined together to form base 1 and the corresponding screwing on of the elements of the clamping device K as well as the attachment of the housing 16 with the integral controls and the attachment of the gallows 14 with the seat 15. The sequence of the individual work steps can of course vary. Now the mobile device is ready for operation and can be placed on the rail track S, whereby the roller pairs 34.1 to 34.6 overlap the rails 41 of the rail track S.

Figure 4:
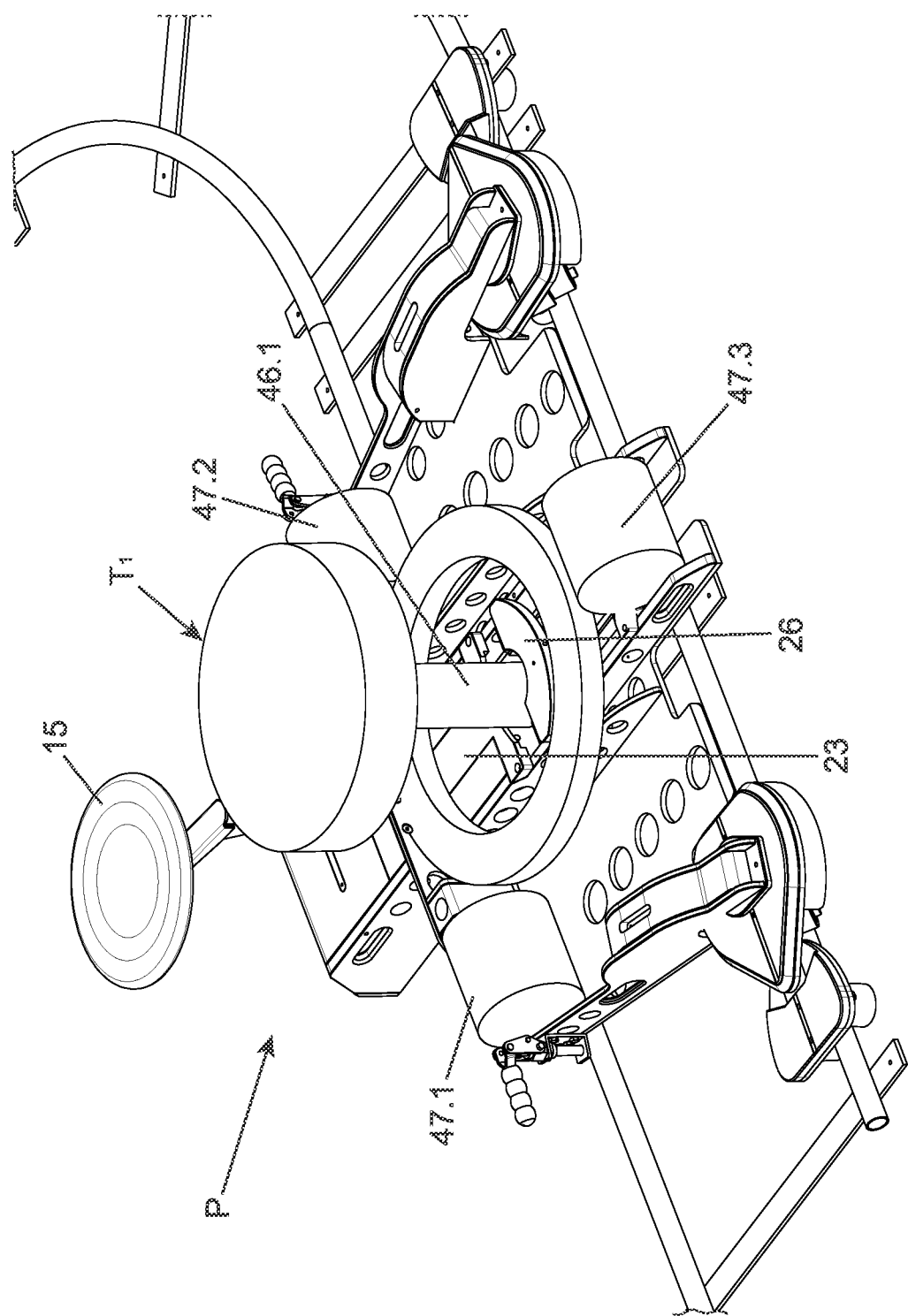
FIG. 4 a further perspective view of the mobile device according to FIG. 1 with a schematic example of a carrier vehicle of a recording device.

If a first carrier vehicle T1, as shown in FIG. 4, with a supporting column 46.1 of smaller diameter, is now pushed onto the movable device P, only two front wheels 47.1 and 47.2 need to be raised slightly so that they drive onto ramps 6. The indention 25 in the T-piece 23 is designed so that a large part of the circumference of the support column 46.1 rests on this indentation 25. On the other hand, the support column 46.1 is supported in the indentation 27 of the trough strip 26, whereby this trough strip 26 can be adjusted relative to the T-piece 23 so that the support column 46.1 is clamped.

A rear wheel 47.3 of the carrier vehicle T1 is also rolled onto the base 1 between the two wall strips 22.1 and 22.2, whereby the partial access ramps 7 are used for this.

Figure 5:
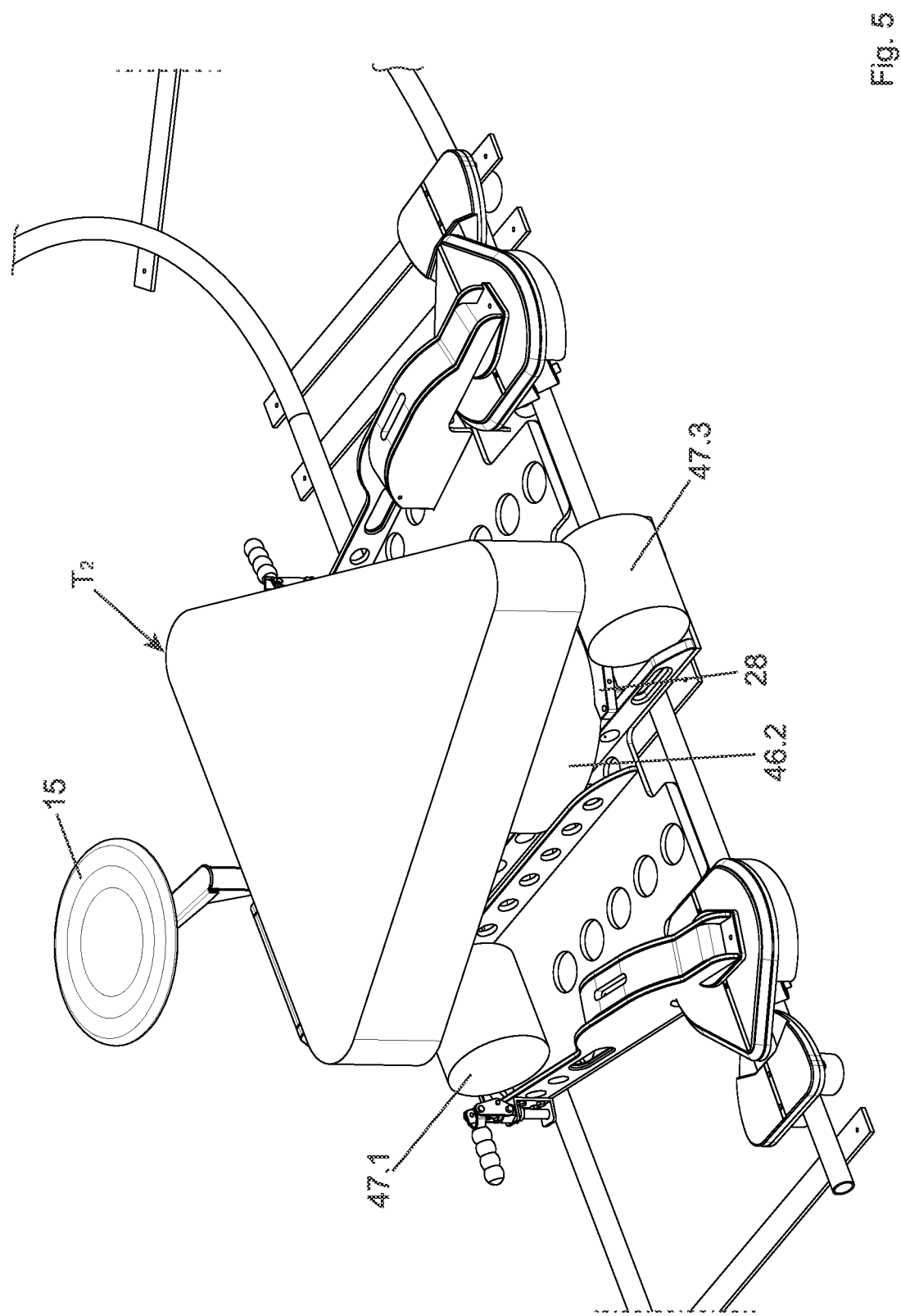
FIG. 5 a further perspective view of the mobile device according to FIG. 1 with a further example of a carrier vehicle for a recording device.

If a different example of a carrier vehicle T2 is to be fixed on base 1 as shown in FIG. 5 with a carrier column 46.2 with a substantially larger diameter, the T-piece 23 is used in conjunction with clamping strip 28. As mentioned above, this clamping strip 28 has an indentation 29 with a larger diameter, so that this indentation 29 can also fit against a support column T2 with a larger diameter.

The invention claimed is:

1. Mobile device (P) for moving a receiving device which is arranged on a support column (46.1, 46.2) and a base (1) is assigned to this support column (46.1, 46.2), wherein the support column (46.1, 46.2) is held by a clamping device (K) on the base (1), wherein the clamping device (K) has at least two indentations (25, 27, 29), the distance between which is variable.

2. Mobile device according to claim 1, wherein the clamping device (K) at least partially encompasses the support column (46.1, 46.2).

3. Mobile device according to claim 1, wherein the clamping device (K) is arranged on the base (1) in a detachable and/or displaceable manner.

4. Mobile device according to claim 1, wherein at least one indentation (25, 27, 29) is at least partially reproduced on the outer circumference of the support column (46.1, 46.2).

5. Mobile device according to claim 4, wherein indentations (25, 27, 29) with different radii are provided at the front edges of a T-piece (23), a trough strip (26) or a clamping strip (28).

6. Mobile device according to claim 1, wherein the base (1) has stops (11) for wheels (47.1, 47.2) on which a carrier vehicle (T1, T2) can be moved on the carrier column (46.1, 46.2), if necessary together with the receiving device.

7. Mobile device according to claim 6, wherein from the base (1), on both sides of the clamping device (K), frame strips (11) protrude which serve as stops for two front wheels (47.1, 47.2).

8. Mobile device according to claim 7, wherein the base (1) also accommodates a third wheel (47.3) of the carrier vehicle (T1, T2) behind the support column (46.1, 46.2).

9. Mobile device according to claim 1, wherein a seat (15) is provided on the base (1).

10. Mobile device according to claim 9, wherein the seat (15) is displaceable on both sides of the clamping device (K).

11. Mobile device according to claim 1, wherein the base (1) has at least two plates (2.1, 2.2) detachably connected to one another.

12. Mobile device according to claim 1, wherein a plurality of rollers (34.1-34.6) is associated with the base (1).

13. Mobile device according to claim 12, wherein a part of the rollers (34.1-34.6) is arranged in a triangle to each other.

14. Mobile device according to claim 13, wherein one corner of the triangle is associated below the clamping device (K) and the seat (15), while the other two corners of the triangle are provided opposite each other at one corner of the plates (2.1,2.2) which are part of the base (1).

15. Mobile device according to claim 14, wherein the rollers (34.1, 34.2) below the clamping device (K) are displaceable along guides (30.1, 30.2) against a direction of travel (x) of the base (1).

16. Mobile device according to claim 14, wherein the rollers (34.3-34.6) are arranged at the two corners of the plates (2.1,2.2) on a support arm (37).

17. Mobile device according to claim 13, wherein the rollers (34.1-34.6) are arranged on a support strip (33), which in turn is rotatable about a vertical axis.

18. Mobile device according to claim 12, wherein a drive (39.1, 39.2) is associated with some of the rollers (34.3-34.6).

19. Mobile device according to claim 18, wherein the drive (39.1, 39.2) comprises two drive rollers (40.1, 40.2), the distance between which is variable.

20. Mobile device according to claim 18, wherein the drive (39.1, 39.2) is directly or indirectly articulately connected to the support arm (37).

21. Mobile device according to claim 1, wherein receivers for counterweights are provided on the base (1).

22. Mobile device according to claim 1, wherein two pedals (42.1, 42.2) are provided on the base (1) for controlling the base (1) in respectively opposite directions (x).

23. Mobile device according to claim 1, wherein it has a modular structure.

24. Mobile device (P) for moving a receiving device which is arranged on a support column (46.1, 46.2) and a base (1) is assigned to this support column (46.1, 46.2), wherein the support column (46.1, 46.2) is held by a clamping device (K) on the base (1), wherein an optical recognition (38) for the operation of the base (1) is associated with the base (1).

25. Mobile device (P) for moving a receiving device which is arranged on a support column (46.1, 46.2) and a base (1) is assigned to this support column (46.1, 46.2), wherein the support column (46.1, 46.2) is held by a clamping device (K) on the base (1), wherein the base (1) is provided with a levelling device (38) for the operation of the base (1).

* * * * *